(12) United States Patent
Iura

(10) Patent No.: US 10,351,393 B2
(45) Date of Patent: Jul. 16, 2019

(54) ENGAGEMENT CONFIRMATION METHOD PERFORMED BY ROBOT

(71) Applicant: HONDA MOTOR CO., LTD., Tokyo (JP)

(72) Inventor: Takeshi Iura, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 200 days.

(21) Appl. No.: 15/645,003

(22) Filed: Jul. 10, 2017

(65) Prior Publication Data

US 2018/0016119 A1 Jan. 18, 2018

(30) Foreign Application Priority Data

Jul. 13, 2016 (JP) .................................. 2016-138276

(51) Int. Cl.
| | |
|---|---|
| B25J 13/00 | (2006.01) |
| B66C 1/66 | (2006.01) |
| B25J 19/04 | (2006.01) |
| B25J 9/16 | (2006.01) |
| B25J 13/08 | (2006.01) |

(52) U.S. Cl.
CPC ............. *B66C 1/663* (2013.01); *B25J 9/1638* (2013.01); *B25J 9/1694* (2013.01); *B25J 9/1697* (2013.01); *B25J 13/085* (2013.01); *B25J 19/04* (2013.01); *B66C 1/66* (2013.01); *G05B 2219/40* (2013.01); *G05B 2219/41123* (2013.01); *G05B 2219/41168* (2013.01)

(58) Field of Classification Search
USPC ................................................. 700/245–264
See application file for complete search history.

(56) References Cited

U.S. PATENT DOCUMENTS

| | | | | |
|---|---|---|---|---|
| 4,187,051 A | * | 2/1980 | Kirsch | B25J 9/041 414/744.3 |
| 5,833,030 A | * | 11/1998 | Klockner | B62D 67/00 187/211 |
| 6,438,453 B1 | * | 8/2002 | Kochanneck | B25J 9/08 318/558 |
| 6,594,552 B1 | * | 7/2003 | Nowlin | B25J 9/1689 700/260 |
| 6,887,428 B2 | * | 5/2005 | Wernz | G01N 1/31 422/301 |
| 9,020,636 B2 | * | 4/2015 | Tadayon | B25J 5/02 700/247 |
| 9,457,474 B1 | * | 10/2016 | Lisso | B25J 9/1697 |
| 2003/0114961 A1 | * | 6/2003 | Riff | B25J 9/046 700/245 |

(Continued)

FOREIGN PATENT DOCUMENTS

JP         2008-230784         10/2008

*Primary Examiner* — Jonathan L Sample
(74) *Attorney, Agent, or Firm* — Rankin, Hill & Clark LLP

(57) ABSTRACT

A robot performs an appropriate operation in accordance with a position control, whereby an operation is carried out to pass a hook as a second engagement member through a hooking hole as a first engagement member. Thereafter, the robot is switched to a servo float control, and receives a command to raise the hook relatively with respect to the hooking hole. An amount of rising of the hook is compared with a maximum allowable amount of rising (threshold value) of the hook.

5 Claims, 4 Drawing Sheets

(56) References Cited

U.S. PATENT DOCUMENTS

| | | | | |
|---|---|---|---|---|
| 2003/0208303 A1* | 11/2003 | Okamoto | ............... | B25J 9/06 700/245 |
| 2004/0099397 A1* | 5/2004 | Sasaoka | ............... | B22D 17/10 164/113 |
| 2005/0131645 A1* | 6/2005 | Panopoulos | ............... | B60P 1/5457 701/472 |
| 2005/0283274 A1* | 12/2005 | Kleinschmitt | ............... | G01N 35/0099 700/245 |
| 2006/0085118 A1* | 4/2006 | Baldwin | ............... | E02F 3/48 701/50 |
| 2007/0076946 A1* | 4/2007 | Kunisaki | ............... | G01B 11/002 382/153 |
| 2007/0169620 A1* | 7/2007 | Kauss | ............... | E02F 3/432 91/508 |
| 2008/0127924 A1* | 6/2008 | Tachino | ............... | F01L 1/20 123/90.54 |
| 2008/0188985 A1* | 8/2008 | Sakano | ............... | B25J 9/1648 700/260 |
| 2009/0326712 A1* | 12/2009 | Marx | ............... | B25J 9/1692 700/254 |
| 2010/0030381 A1* | 2/2010 | Clifford | ............... | B05B 13/0292 700/258 |
| 2011/0138601 A1* | 6/2011 | Kilibarda | ............... | B62D 65/026 29/428 |
| 2012/0030924 A1* | 2/2012 | Kilibarda | ............... | B62D 65/026 29/525.01 |
| 2012/0078415 A1* | 3/2012 | Kubo | ............... | B25J 9/1623 700/245 |
| 2012/0199753 A1* | 8/2012 | Chuang | ............... | G01V 5/0008 250/390.04 |
| 2013/0166071 A1* | 6/2013 | Kranz | ............... | B25J 9/1633 700/260 |
| 2014/0360832 A1* | 12/2014 | Aldrich | ............... | H02G 11/02 191/12.2 R |
| 2016/0178430 A1* | 6/2016 | Holcomb | ............... | B25J 19/02 29/407.08 |
| 2016/0304281 A1* | 10/2016 | Elazary | ............... | B66F 9/07 |
| 2018/0155129 A1* | 6/2018 | Lagziel | ............... | B25J 5/02 |
| 2018/0169813 A1* | 6/2018 | Wanner | ............... | B23B 41/00 |

* cited by examiner

ENGAGEMENT CONFIRMATION METHOD PERFORMED BY ROBOT

CROSS-REFERENCE TO RELATED APPLICATION

This application is based upon and claims the benefit of priority from Japanese Patent Application No. 2016-138276 filed on Jul. 13, 2016, the contents of which are incorporated herein by reference.

BACKGROUND OF THE INVENTION

Field of the Invention

The present invention relates to an engagement confirmation method performed by a robot for confirming by a robot operation whether or not a first engagement member provided on a workpiece, and a second engagement member provided on a retaining body that retains the workpiece are engaged with each other.

Description of the Related Art

An internal combustion engine, which is a propulsive drive source for an automobile, is a considerable heavy object, and it is difficult to manually transport the internal combustion engine between work stations in a factory for manufacturing automobiles. For this reason, transport devices are provided between the work stations. The internal combustion engine is transported from a station where a predetermined operation has been completed to a station where a next operation is to be performed, in a state in which the internal combustion engine is suspended from the transport device.

In order to carry out suspension thereof, the transport device includes a plurality of hooks provided at distal ends of chains, as described, for example, in Japanese Laid-Open Patent Publication No. 2008-230784. The respective hooks are passed through predetermined hooking holes of the internal combustion engine, and by applying tension to the chains, the internal combustion engine is held in a state of being suspended from the transport device.

SUMMARY OF THE INVENTION

The operation of passing the hooks through the hooking holes is performed by an operator. In other words, such an operation is carried out by manpower (a manual operation). For reducing the burden on the operator, there is a demand to replace such a manual operation with an automated operation performed by a robot.

It should be recalled that, with an automated operation performed by a robot, the internal combustion engine is arranged in a preset predetermined location each time the operation is carried out in order to pass the hook through the hooking hole. This is because, in this case, by operating the robot in accordance with teaching, there is a high possibility that the hook will pass through the hooking hole.

In contrast thereto, in the event that the internal combustion engine becomes misaligned from the predetermined location due to some external cause, the hook may not pass through the hooking hole. In this manner, with such an automated operation performed by the robot, it is assumed that a situation may occur in which the hook does not pass through the hooking hole. In this case, it is not possible for the internal combustion engine to be suspended.

Thus, it is necessary to determine whether or not the hook has passed through the hooking hole. For this purpose, it may also be considered to arrange a camera in the vicinity of the hooking hole, and make such a determination based on an image captured by the camera. However, in this case, in addition to the camera, a means for performing the determination such as a computer or the like is required, so that in addition to the facilities becoming more complex, there is a disadvantage in that facility costs rise steeply.

A principal object of the present invention is to provide an engagement confirmation method performed by a robot, which can simplify the configuration thereof and achieve a reduction in facility costs.

According to an embodiment of the present invention, an engagement confirmation method performed by a robot is provided, in which a second engagement member disposed on a retaining body configured to retain a workpiece is relatively brought closer to a first engagement member disposed on the workpiece, and thereafter, it is confirmed by an operation of the robot whether or not the first engagement member and the second engagement member are engaged with each other, the method containing the steps of:

operating the robot in accordance with a position control, and relatively bringing the first engagement member closer to the second engagement member; and switching the robot to a servo float control, and issuing a command to raise the second engagement member relatively with respect to the first engagement member;

wherein the first engagement member and the second engagement member are determined to be engaged with each other when a relative amount of rising of the second engagement member until the second engagement member is stopped is equal to or lies within a predetermined threshold value, whereas the first engagement member and the second engagement member are determined not to be engaged when the relative amount of rising of the second engagement member exceeds the threshold value.

In accordance with the servo float control, it is possible to stop the operation of the robot when a predetermined load acts on the robot. Accordingly, when the predetermined load is applied to the second engagement member, and therefore the second engagement member is stopped, it can be determined that "the first engagement member and the second engagement member are engaged with each other" in the event that the relative amount of rising until the stoppage of the second engagement member is equal to or lies within the predetermined threshold value.

In contrast thereto, when the first engagement member and the second engagement member are not engaged, a load is applied to the second engagement member. Therefore, the second engagement member rises in excess of the threshold value. Based on this fact, it can be determined that "the first engagement member and the second engagement member are not engaged" in the event that the relative amount of rising of the second engagement member exceeds the threshold value.

In the foregoing manner, according to the present invention, after the engagement operation is carried out with the robot, using the robot, it is possible to confirm whether or not engagement has actually occurred. More specifically, there is no need for an image processing means such as a camera, a computer, etc. Consequently, the facilities can be simplified and investment costs in facilities can be reduced.

When the robot is operated in accordance with the servo float control, a distal end hand unit of the robot preferably is set to be capable of rising, only if a load that acts on the distal end hand unit is greater than or equal to a total weight of the distal end hand unit and the second engagement member, and is less than or equal to a rated load of the robot.

By setting the distal end hand unit to be capable of ascending only when the load that acts on the distal end hand unit of the robot is greater than or equal to the total weight of the distal end hand unit and the second engagement member, it is possible to avoid a situation in which the distal end hand unit, and hence the second engagement member, does not rise. Further, by making it impossible to raise the distal end hand unit when the load acts in excess of the rated load, it is possible to prevent an excessive load from acting on the robot.

A preferred typical example of the first engagement member is a through hole. On the other hand, in this case, a preferred typical example of the second engagement member is a hook. With this configuration, the robot performs an operation to raise the hook relatively with respect to the through hole. Consequently, it can easily be determined whether or not the hook is engaged with the through hole, or in other words, whether or not the hook has passed through the through hole.

According to the present invention, after carrying out an engagement operation for engaging the first engagement member with the second engagement member using the robot, the robot is switched to the servo float control and the second engagement member is raised relatively to the first engagement member. Then, based on whether or not the amount of relative rising lies within the predetermined threshold value, it is determined whether or not the first engagement member and the second engagement member are engaged with each other.

More specifically, using the robot that performs the engagement operation, it is possible to confirm whether or not engagement has actually taken place. Therefore, it is unnecessary to provide another confirmation mechanism such as an image processing means or the like. Thus, the facilities can be simplified. In addition, investment costs in facilities can be reduced.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of an engagement confirmation method performed by a robot according to the present invention, in relation to a work station in which a robot is included for implementing the engagement confirmation method, will be presented and described in detail below with reference to the accompanying drawings.

Figure 1:
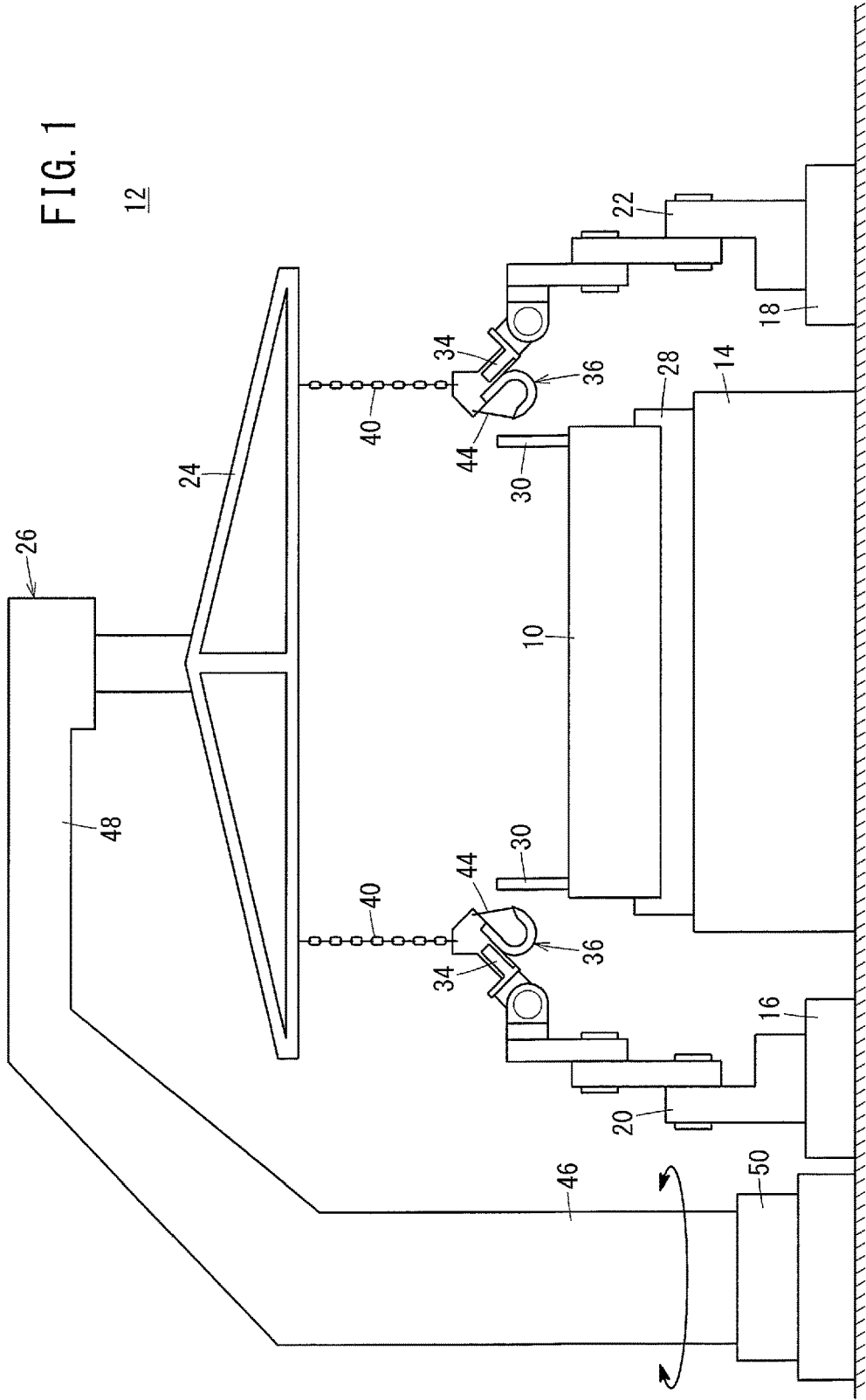
FIG. 1 is a schematic front view of principal parts of a work station constituted to include a robot that implements an engagement confirmation method according to an embodiment of the present invention.

FIG. 1 is a schematic front view of principal parts of a work station 12 in which predetermined operations are performed with respect to an internal combustion engine 10. The work station 12 is constituted to include a workpiece mounting base 14, a first robot 20 and a second robot 22, which are positioned and fixed respectively on two robot pedestals 16 and 18, and a rotating arm 26 on which a hanger 24 (retaining body) is provided.

Figure 2:
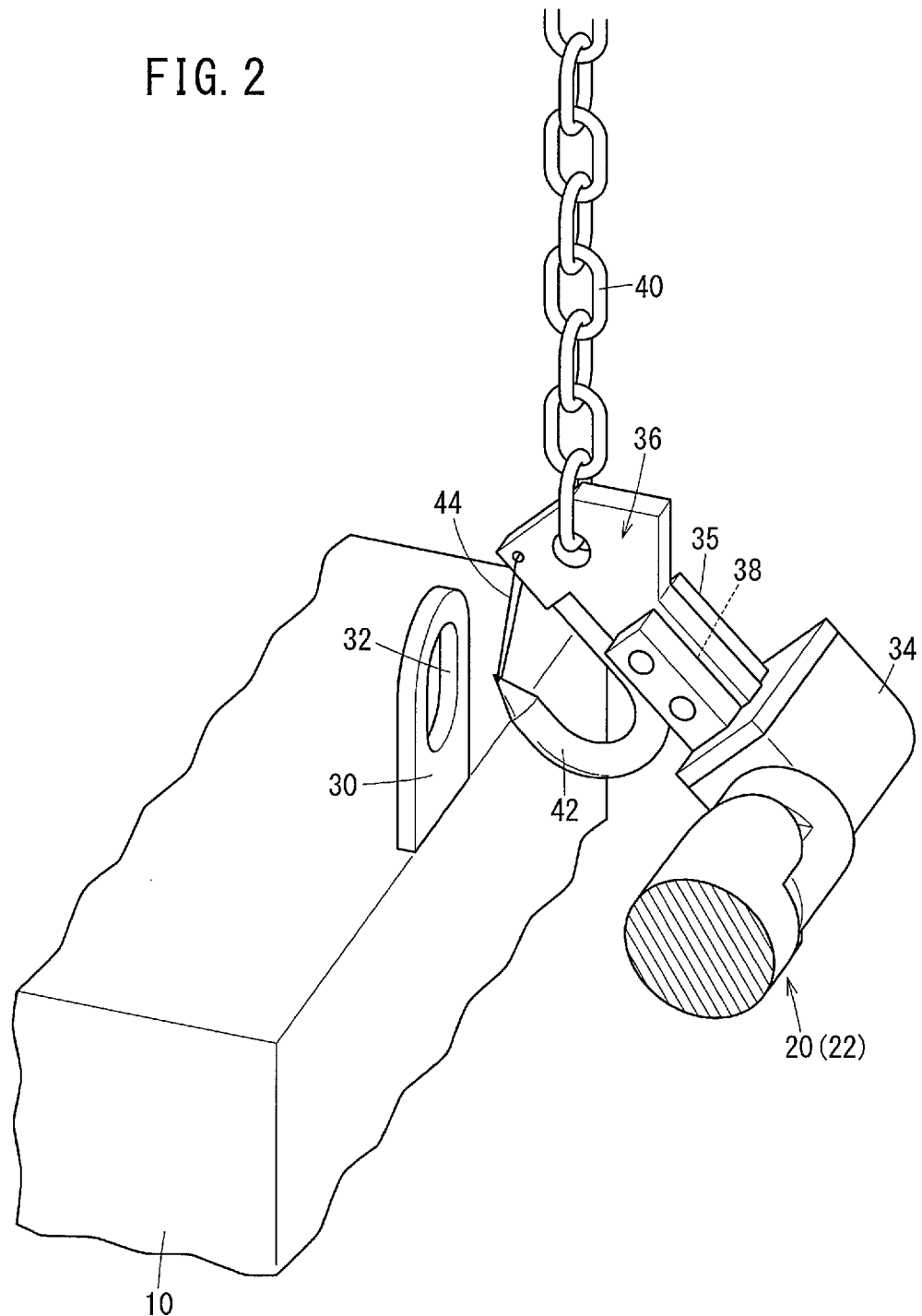
FIG. 2 is a schematic perspective view of principal parts showing a state in which a hook (first engagement member) is held by a distal end hand unit of a robot that implements the engagement confirmation method.

The internal combustion engine 10 as a workpiece is placed at a predetermined location on the workpiece mounting base 14 through a pallet 28. Engagement jigs 30 shown in FIG. 2 are supported at a plurality of predetermined positions in the internal combustion engine 10. A hooking hole 32 (first engagement member) is formed as a through hole in the vicinity of an upper end of each of the engagement jigs 30. In this case, the hooking holes 32 are shaped in the form of elongate holes in the vertical direction.

Both the first robot 20 and the second robot 22 are multi-jointed articulated robots, for example, 6-axis robots. The first robot 20 and the second robot 22 are disposed, for example, on a diagonal line of the internal combustion engine 10.

A distal end hand unit 34 of the first robot 20 includes a block-shaped portion 35 having a substantially flat plate shape. As will be discussed later, the block-shaped portion 35 enters into an insertion groove 38 formed in a hook 36 (second engagement member) shown in FIG. 2. A non-illustrated load detecting means is provided in the distal end hand unit 34. By the load detecting means, it is possible to detect a load that acts on the distal end hand unit 34. A preferred example of the load detecting means is a force sensor.

The first robot 20 and the second robot 22 are taught in advance, and following such teaching, the first robot 20 and the second robot 22 are capable of being operated based on a position control. Further, the first robot 20 and the second robot 22 can also be operated based on a servo float control. The first robot 20 and the second robot 22 are operated under the control of a non-illustrated control unit. Switching from the position control to the servo float control is also carried out by the control unit.

A plurality of chain wires 40 are supported on the hanger 24. The hooks 36 shown in FIG. 2 are disposed on distal ends of the respective chain wires 40. Each of the hooks 36 includes a bent portion 42 and a detachment preventive metal member 44, and together therewith, an insertion groove 38 is formed on a surface (rear surface) opposite to the direction in which the bent portion 42 is bent.

The rotating arm 26 includes a base portion 46 erected substantially vertically, and a horizontal portion 48 which is bent and extends from the base portion 46 in a substantially horizontal direction. The base portion 46 is connected to a rotating shaft 50, and the horizontal portion 48 rotates about the center of the base portion 46 accompanying rotation of the rotating shaft 50. The hanger 24 is supported in a state of being suspended from the distal end of the horizontal portion 48.

In the work station 12, which is configured as described above, the engagement confirmation method according to the present embodiment is carried out in the following manner.

At first, the pallet 28 is incorporated below the internal combustion engine 10, and the internal combustion engine 10 with the engagement jigs 30 supported thereon is carried into the work station 12. Thereafter, predetermined operations such as machining and assembly, etc., are performed on the internal combustion engine 10.

Figure 3C:
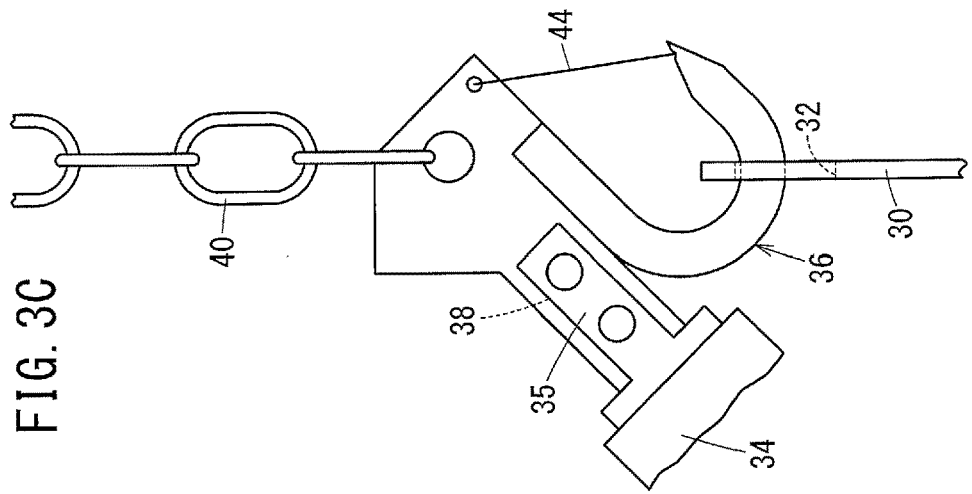
FIGS. 3A to 3C are flow diagrams illustrating a process of engaging the hook with a hooking hole (second engagement member) by changing a posture of the distal end hand unit.
Figure 3B:
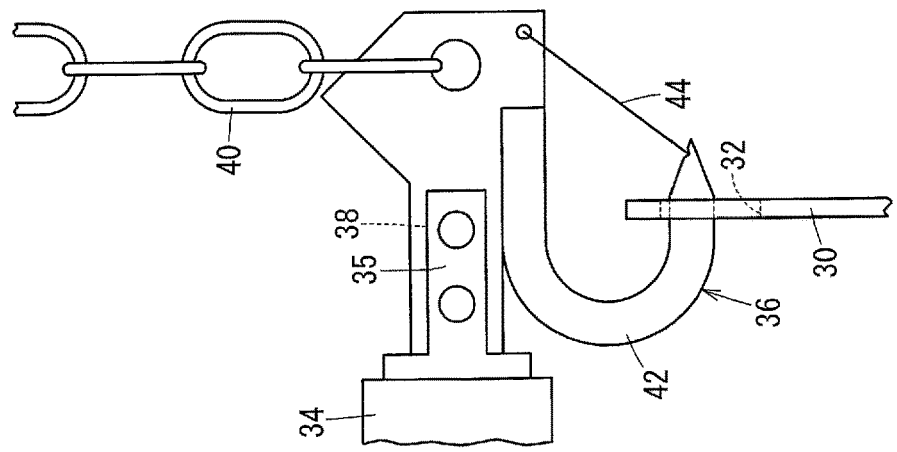
Figure 3A:
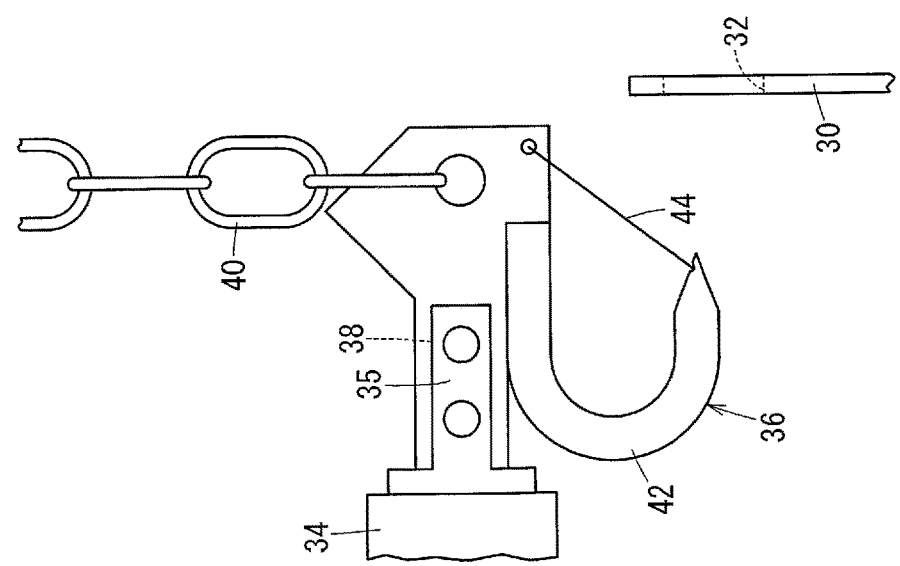

Next, the first robot 20 and the second robot 22 pass the bent portions 42 of the hooks 36 through the hooking holes 32 of the engagement jigs 30, in order to unload or outwardly convey the internal combustion engine 10, on which the operations have been completed, by the rotating arm 26. More specifically, the first robot 20 and the second robot 22 are operated appropriately, and the block-shaped portions 35 of the distal end hand units 34 are inserted respectively into the insertion grooves 38 of the separate hooks 36. Then, as shown in FIG. 3A, the first robot 20 and the second robot 22 are further operated to bring the hooks 36 into close proximity to the hooking holes 32. At this time, the detachment preventive metal members 44 face toward the engagement jigs 30.

In addition, by changing the postures of the distal end hand units 34, the detachment preventive metal members 44 are pressed toward the bent portions 42 due to interference thereof with the engagement jigs 30. Thereafter, as shown in FIG. 3B, the distal ends of the bent portions 42 are passed through the hooking holes 32. When released from interference with the engagement jigs 30, the detachment preventive metal members 44 return to their original positions under an elastic action of non-illustrated return springs.

Accompanying a further change in the postures of the distal end hand units 34, the postures of the hooks 36 change. As a result, as shown in FIG. 3C, the hooks 36 are passed through the hooking holes 32 in following relation to the curving of the bent portions 42. More specifically, the relative positioning of each of the hooking holes 32 with respect to the bent portion 42 becomes substantially in a mid-section of the bent portion 42. Up to this point, the operations of the first robot 20 and the second robot 22 are based on a position control.

Although an ideal case has been described above, a situation will be assumed in which one or some of the hooks 36 does not pass through the hooking hole 32, for example, because positional misalignment of the internal combustion engine 10 has occurred due to some external cause. Thus, by operating the first robot 20 and the second robot 22, the control unit determines whether or not the hooks 36 have passed through the hooking holes 32.

More specifically, the control unit switches the first robot 20 and the second robot 22 over to a servo float control, together with issuing command signals thereto in order to "raise the distal end hand unit 34". Under the servo float control, the distal end hand unit 34 is made capable of rising only if the load that acts on the distal end hand unit 34 lies within a predetermined range.

According to the present embodiment, the predetermined range is set to be greater than or equal to the total weight of the distal end hand unit 34 and the hook 36, and less than or equal to the rated load of each of the first robot 20 and the second robot 22. Moreover, the rated load is less than the weight of the internal combustion engine 10.

At this point in time, the state is maintained in which the distal end hand unit 34 is inserted into the insertion groove 38 of the hook 36. Therefore, when the distal end hand unit 34 rises under the control of the control unit, the hook 36 is raised in following relation therewith. When the hook 36 is passed through the hooking hole 32, as shown in FIG. 4, the hook 36 (bent portion 42) rises relatively in the interior of the hooking hole 32, and is blocked by the ceiling wall of the hooking hole 32.

At this time, the weight of the internal combustion engine 10 is applied as a load to the distal end hand unit 34. Consequently, a load in excess of the rated load acts on the distal end hand unit 34. When such an occurrence is detected by the load detecting means (a force sensor or the like), the control unit causes the upward movement of the distal end hand unit 34 to stop. More specifically, the internal combustion engine 10 does not move upward and does not separate away from the workpiece mounting base 14. Consequently, application of an excessive load to the first robot 20 and the second robot 22 is avoided.

Figure 4:
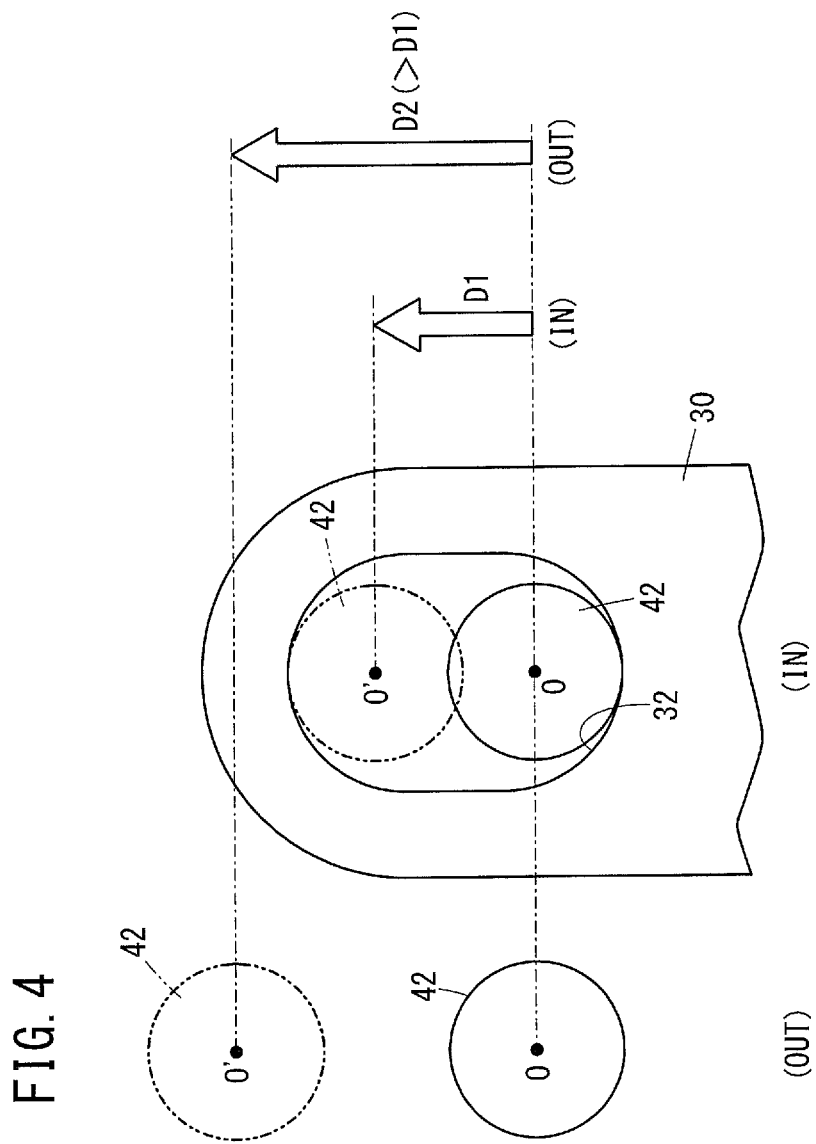
FIG. 4 is a vertical cross-sectional view of principal parts, showing a state in which the hook is raised relatively with respect to the hooking hole.

Thus, the maximum allowable amount of rising of the hook 36 is represented by D1 in FIG. 4. More specifically, the maximum allowable amount of rising is a distance that is defined from the center O thereof when the hook 36 is at a bottom dead center position abutting against the bottom wall of the hooking hole 32, to the center O' thereof when the hook 36 is at a top dead center position abutting against the ceiling wall of the hooking hole 32. Such a distance (maximum allowable amount of rising) D1 is input in advance to the control unit as a threshold value.

In summary, even if a command to rise is given to the distal end hand unit 34, when the hook 36 is passed through the hooking hole 32, the amount by which the hook 36 rises lies within the distance D1 (including 0), and further rising beyond such an amount does not take place. Based on this fact, the control unit compares the amount of rising of the hook 36 with the distance D1 up until the point at which the hook 36 is stopped, and if the amount of rising thereof at the time of stoppage is equal to or lies within the distance D1, a determination is made that "the hook 36 has passed through the hooking hole 32", or stated otherwise, that the hook 36 is placed in an "IN" state shown in FIG. 4.

In the case that such a determination is made, the distal end hand units 34 are disengaged and separated away from the insertion grooves 38 of the hooks 36. Furthermore, as the hanger 24 rises slightly, the chain wires 40 are strained, and as a result, the internal combustion engine 10 is suspended from the hanger 24. In such a state, the rotating shaft 50 is energized, and accompanying rotation of the rotating arm 26 about the base portion 46, the internal combustion engine 10 is conveyed out to another work station (not shown) where a subsequent operation is performed.

On the other hand, as also shown in FIG. 4, when the hook 36 has not passed through the hooking hole 32, the hook 36 continues to rise. This is because there is no member serving to block the hook 36.

In this instance, the control unit compares the amount of rising of the hook 36 with the maximum allowable amount of rising D1, as described above. In addition, if the amount of rising of the hook 36 exceeds the distance D1 (in FIG. 4, D2 is greater than D1), the control unit determines that "the hook 36 has not passed through the hooking hole 32". This is because, in the case that the hook 36 has passed through the hooking hole 32, as described above, the hook 36 abuts against and is stopped by the ceiling wall of the hooking hole 32, and the amount of rising thereof is D1 at a maximum. More specifically, in the present case, it is determined that the state represented by "OUT" in FIG. 4 has occurred.

In the foregoing manner, by operating the first robot 20 and the second robot 22 in accordance with the servo float control, it is possible to easily determine whether or not the hooks 36 have passed through the hooking holes 32. Consequently, there is no need to provide an image processing means such as a camera, a computer, etc. Such a feature enables the configuration of the work station 12 to be simplified. Further, facility investment costs can be reduced.

Moreover, the control unit issues a warning when it is determined that "the hook 36 has not passed through the hooking hole 32". Having sensed such a warning, the operator may manually pass the hook 36 through the hooking hole 32.

The present invention is not particularly limited to the above-described embodiment, and various modifications can be adopted therein without departing from the scope of the present invention as set forth in the appended claims.

For example, hooks may be provided on the workpiece, and engagement jigs in which hooking holes are formed may be provided on the retaining body via chain wires. In this case, the engagement jigs on the retaining body can be moved into proximity to the hooks on the workpiece.

Further, it is a matter of course that the workpiece is not limited in particular to being an internal combustion engine 10.

What is claimed is:

1. An engagement confirmation method performed by a robot, in which a second engagement member disposed on a retaining body configured to retain a workpiece is relatively brought closer to a first engagement member disposed on the workpiece, and thereafter, it is confirmed by an operation of the robot whether or not the first engagement member and the second engagement member are engaged with each other, comprising the steps of:
   operating the robot in accordance with a position control, and relatively bringing the first engagement member closer to the second engagement member; and
   switching the robot to a servo float control, and issuing a command to raise the second engagement member relatively with respect to the first engagement member;
   wherein the first engagement member and the second engagement member are determined to be engaged with each other when a relative amount of rising of the second engagement member until the second engagement member is stopped is equal to or lies within a predetermined threshold value, whereas the first engagement member and the second engagement member are determined not to be engaged when the relative amount of rising of the second engagement member exceeds the threshold value.

2. The engagement confirmation method performed by the robot according to claim 1, wherein when the robot is operated in accordance with the servo float control, a distal end hand unit of the robot is set to be capable of rising, only if a load that acts on the distal end hand unit is greater than or equal to a total weight of the distal end hand unit and the second engagement member, and is less than or equal to a rated load of the robot.

3. The engagement confirmation method performed by the robot according to claim 1, wherein the first engagement member is a through hole and the second engagement member is a hook, and the robot performs an operation to raise the hook relatively with respect to the through hole.

4. The engagement confirmation method performed by the robot according to claim 3, wherein the hook includes a bent portion that is passed through the through hole, and a detachment preventive metal member configured to prevent detachment of the bent portion from the through hole.

5. The engagement confirmation method performed by the robot according to claim 1, wherein a warning is issued when it is determined that the first engagement member and the second engagement member are not engaged.

* * * * *